(12) United States Patent
Segawa et al.

(10) Patent No.: US 12,410,275 B2
(45) Date of Patent: *Sep. 9, 2025

(54) VEHICLE WIPER BLADE

(71) Applicant: CANON KABUSHIKI KAISHA, Tokyo (JP)

(72) Inventors: Shota Segawa, Shizuoka (JP); Takehiko Aoyama, Shizuoka (JP); Masanori Yokoyama, Shizuoka (JP); Hidekazu Matsuda, Shizuoka (JP); Syoji Inoue, Shizuoka (JP); Arihiro Yamamoto, Shizuoka (JP); Youhei Ikeda, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

This patent is subject to a terminal disclaimer.

(21) Appl. No.: 18/158,633

(22) Filed: Jan. 24, 2023

(65) Prior Publication Data

US 2023/0159692 A1  May 25, 2023

Related U.S. Application Data

(63) Continuation of application No. PCT/JP2021/028372, filed on Jul. 30, 2021.

(30) Foreign Application Priority Data

Jul. 31, 2020 (JP) .................................. 2020-130696
Jul. 7, 2021 (JP) .................................. 2021-112683

(51) Int. Cl.
*C08G 18/66* (2006.01)
*B60S 1/38* (2006.01)
(Continued)

(52) U.S. Cl.
CPC .............. *C08G 18/664* (2013.01); *B60S 1/38* (2013.01); *C08G 18/10* (2013.01);
(Continued)

(58) Field of Classification Search
CPC .. C08G 18/664; C08G 18/10; C08G 18/3206; C08G 18/4283; C08G 18/6644;
(Continued)

(56) References Cited

U.S. PATENT DOCUMENTS 4,622,712 A * 11/1986 Sugita ....................... B60S 1/38
264/340
4,719,247 A    1/1988 Lin et al.
(Continued)

FOREIGN PATENT DOCUMENTS

CN    104133359 A    11/2014
CN    108369394 A    8/2018
(Continued)

OTHER PUBLICATIONS

Aoyama et al., U.S. Appl. No. 18/158,628, filed Jan. 24, 2023.
(Continued)

*Primary Examiner* — Donald M Flores, Jr.
(74) *Attorney, Agent, or Firm* — Venable LLP (57) ABSTRACT

A vehicle wiper blade comprises a blade support part and a lip part coupled swingably with the blade support part via a neck. The lip part comprises polyurethane. The polyurethane comprises a reactant of a composition including an isocyanate compound which includes diisocyanate and tri- or higher functional polyfunctional isocyanate, and an alcohol which includes tri- or higher functional polyfunctional alcohol. The diisocyanate has an aromatic ring in a molecule. When a molecule of the polyurethane is ionized with a mass spectrometer of a direct sample injection system, then obtained M1, M2 and M3 satisfy the following relation:

(Continued)

M2/M1 is 0.001 to 0.028, M3/M1 is 0.020 to 0.110, and M2/M3 is 0.013 to 0.300, and a concentration of the polyfunctional alcohol in the polyurethane is 0.12 mmol/g to 0.65 mmol/g.

5 Claims, 3 Drawing Sheets

(51) Int. Cl.
  *C08G 18/10* (2006.01)
  *C08G 18/32* (2006.01)
  *C08G 18/42* (2006.01)
  *C08G 18/76* (2006.01)

(52) U.S. Cl.
  CPC ..... *C08G 18/3206* (2013.01); *C08G 18/4283* (2013.01); *C08G 18/6644* (2013.01); *C08G 18/7664* (2013.01)

(58) Field of Classification Search
  CPC ... C08G 18/7664; C08G 18/6677; B60S 1/38; B60S 2001/3829; Y10T 428/24512
  See application file for complete search history.

(56) References Cited

U.S. PATENT DOCUMENTS

| | | | |
|---|---|---|---|
| 4,997,901 | A | 3/1991 | Yamada et al. |
| 5,100,731 | A | 3/1992 | Yamada et al. |
| 6,002,911 | A | 12/1999 | Suzuki et al. |
| 9,037,069 | B2 | 5/2015 | Watabe et al. |
| 9,632,474 | B2 | 4/2017 | Yamamoto et al. |
| 9,996,047 | B2 | 6/2018 | Kawakami et al. |
| 10,088,795 | B2 | 10/2018 | Ikeda et al. |
| 10,203,648 | B2 | 2/2019 | Takeyama et al. |
| 10,274,890 | B2 | 4/2019 | Kimura et al. |
| 10,705,477 | B1 | 7/2020 | Tano et al. |
| 11,630,411 | B2 | 4/2023 | Yamamoto et al. |
| 2006/0229425 | A1 | 10/2006 | Inoue et al. |
| 2017/0003644 | A1 | 1/2017 | Yamamoto et al. |
| 2017/0349762 | A1 | 12/2017 | Sasaki et al. |
| 2022/0291622 | A1 | 9/2022 | Yamamoto et al. |
| 2023/0157492 | A1* | 5/2023 | Segawa .............. C08G 18/7671 15/245 |

FOREIGN PATENT DOCUMENTS

| | | |
|---|---|---|
| CN | 109313408 A | 2/2019 |
| EP | 0 622 709 A2 | 11/1994 |
| JP | 57-77241 A | 5/1982 |
| JP | 64-56717 A | 3/1989 |
| JP | 2004-51894 A | 2/2004 |
| JP | 2004-231058 A | 8/2004 |
| JP | 2005091835 A | 4/2005 |
| JP | 2020-94096 A | 6/2020 |
| JP | 2021-92756 A | 6/2021 |
| WO | 2016/098336 A1 | 6/2016 |
| WO | 2019/176659 A1 | 9/2019 |
| WO | 2022/025246 A1 | 2/2022 |
| WO | 2022/025262 A1 | 2/2022 |
| WO | 2022/025267 A1 | 2/2022 |
| WO | 2022/025273 A1 | 2/2022 |

OTHER PUBLICATIONS

Aoyama et al., U.S. Appl. No. 18/158,617, filed Jan. 24, 2023.
Segawa et al., U.S. Appl. No. 18/158,608, filed Jan. 24, 2023.
International Search Report in International Application No. PCT/JP2021/028372 (Oct. 2021).
Extended European Search Report in European Application No. 21850856.2 (Aug. 2024).
First Office Action in Chinese Application No. 202180058811.5 (Apr. 2024).
Non-final Office Action in U.S. Appl. No. 18/158,608 (Jun. 2025).

* cited by examiner

VEHICLE WIPER BLADE

CROSS-REFERENCE TO RELATED APPLICATION

This is a continuation of International Application No. PCT/JP2021/028372, filed on Jul. 30, 2021, and designated the U.S., and claims priority from Japanese Patent Application No. 2020-130696 filed on Jul. 31, 2020, and Japanese Patent Application No. 2021-112683 filed on Jul. 7, 2021, the entire contents of which are incorporated herein by reference.

BACK GROUND OF THE INVENTION

Field of the Invention

The present disclosure relates to a vehicle wiper blade for wiping the surface of a to-be-cleaned member.

Background Art

For a vehicle wiper blade, natural rubber, chloroprene rubber, or the like has been used. The rubber has an unsaturated bond, and, hence, is easily deteriorated.

As one of related art, Japanese Laid-Open Patent Application Publication No. 2004-51894 proposes use of polyurethane as a material not having an unsaturated bond.

SUMMARY OF THE INVENTION

At least one aspect of the present disclosure is directed to providing a vehicle wiper blade capable of exhibiting excellent wipability.

According to at least one aspect of the present disclosure, there is provided
a vehicle wiper blade comprising:
a blade support part; and
a lip part coupled swingably with the blade support part via a neck,
a part of the lip part being brought into contact with a surface of a to-be-cleaned member, and thereby the surface of the to-be-cleaned member being cleaned,
the lip part comprising polyurethane,
the polyurethane comprises a reactant of a composition including:
an isocyanate compound which includes diisocyanate and tri- or higher functional polyfunctional isocyanate, and
an alcohol which includes tri- or higher functional polyfunctional alcohol,
the diisocyanate having an aromatic ring in a molecule thereof, wherein
when the polyurethane is heated up to 1000° C. at a temperature rise rate of 10° C./s using a mass spectrometer of direct sample introduction type in which a sample is heated and vaporized in an ionization chamber and a molecule of the sample is ionized, then obtained
a detected amount of all ions is defined as M1,
an integrated intensity of a peak in an extracted ion thermogram corresponding to a range of an m/z value derived from the tri- or higher functional polyfunctional isocyanate is defined as M2, and
an integrated intensity of a peak in an extracted ion thermogram corresponding to an range of an m/z value derived from the diisocyanate is defined as M3,
M2/M1 is 0.001 to 0.028,
M3/M1 is 0.020 to 0.110,
M2/M3 is 0.013 to 0.300, and
a concentration of the tri- or higher functional polyfunctional alcohol in the polyurethane is 0.12 mmol/g to 0.65 mmol/g.

Further features of the present invention will become apparent from the following description of exemplary embodiments with reference to the attached drawings.

DESCRIPTION OF THE EMBODIMENTS

In the present disclosure, the description "from XX to YY" or "XX to YY" indicative of the numerical value range means the numerical value range including the lower limit and the upper limit of the endpoints unless otherwise specified. When the numerical value range is described in stages, the upper limit and the lower limit of each numerical value range can be combined arbitrarily.

In recent years, a treatment such as a water repellent treatment or wax coating on a glass surface has often been performed in order to ensure a favorable visual field. As a result of this, although partial wipability is enhanced, contact unevenness with the glass surface occurs, which may result in the occurrence of a vibration. The unusual sound caused by the contact unevenness gives an unpleasant feeling to a driver. Further, the vibration itself may cause the reduction of the wipability. According to the study by the present inventors, the wiper blade made of polyurethane as described in Japanese Laid-Open Patent Application Publication No. 2004-51894 has still room for improvement in terms of wipability of a deposit such as raindrop deposited on a wind shield. The present inventors considered that, with a conventional wiper blade made of polyurethane, a difference is caused in how the force is transmitted to the to-be-cleaned surface between the hard segment part and the soft segment part in polyurethane, resulting in the occurrence of, for example, streak-shaped unwiped portions.

A further study based on such consideration provided findings that it is effective for a still further improvement of the wipability that the elastic part of the wiper blade comprises specific polyurethane. The specific polyurethane suppresses the aggregation of the hard segments. As a result, conceivably, the transmission of the force to the to-be-cleaned surface becomes uniform in the longitudinal (width) direction of the wiper blade, and the occurring of the streak-shaped unwiped portions can be effectively suppressed.

Configuration of Vehicle Wiper Blade

A vehicle wiper blade in accordance with the present disclosure (which will be also hereinafter referred to simply as a wiper blade) can be used for equipment including transport equipment such as a vehicle as typified by a car, an airplane, or a ship, or industrial machinery equipment such as a construction machine.

Figure 1:
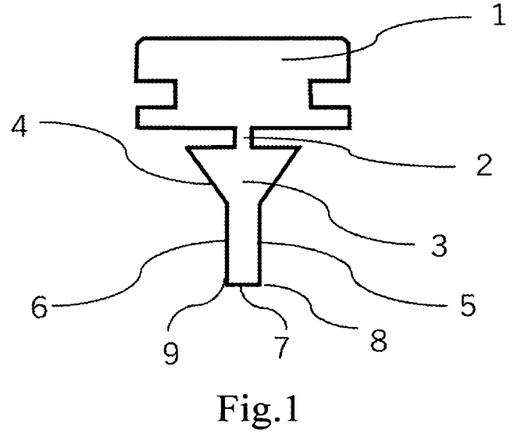
FIG. 1 is one example of the schematic view of a wiper blade.

The wiper blade comprises, as shown in FIG. 1, a blade support part 1, and a lip part 3 swingably coupled with the blade support part via a neck 2. The wiper blade is formed in a cross sectional shape generally uniform in the longitudinal direction.

Although the shape of the lip part 3 has no particular restriction, for example, the shape may be a shape in which the cross section in the direction orthogonal to the longitudinal direction of the wiper blade has a width gradually decreasing from the side closer to the blade support part 1 in the direction away from the blade support part 1.

The wiper blade comes in contact at a part of the lip part with the surface of the to-be-cleaned member typified by a glass surface, and thereby cleans the surface of the to-be-cleaned member.

For example, mention may be made of an aspect in which in a cross section in the direction orthogonal to the longitudinal direction of the wiper blade, the neck 2 is narrowed in width with respect to the blade support part 1 and the lip part 3.

Figure 2A:
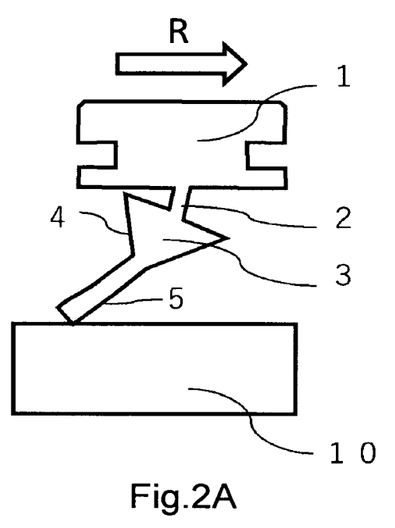
FIGS. 2A and 2B are each an explanatory view showing the state during the cleaning process of a wiper blade.
Figure 2B:
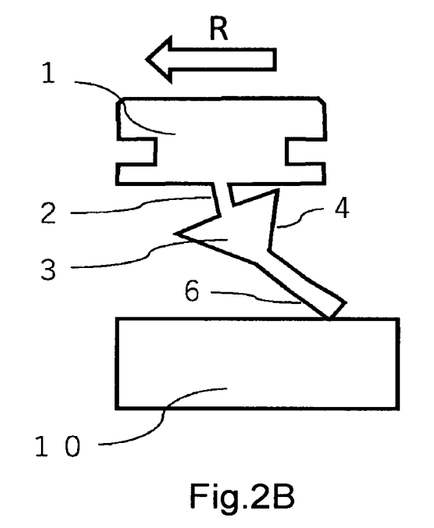

As a result of this, as shown in FIGS. 2A and 2B, the lip part 3 is inclined in the wiping direction, and comes in contact with the surface of the to-be-cleaned member.

FIG. 2A and FIG. 2B are each an explanatory view showing a state in the cleaning process of the wiper blade.

R represents the cleaning direction of the wiper blade. This indicates that the surface to be brought into contact with the to-be-cleaned member is switched according to the cleaning direction.

For example, in FIG. 2A, the action of the neck 2 causes the lip part 3 of the wiper blade to be inclined to the right side shown on the paper, so that the right side of the lip part 3 shown on the paper comes in contact with the to-be-cleaned member 10.

On the other hand, in FIG. 2B, the action of the neck 2 causes the lip part 3 of the wiper blade to be inclined to the left side shown on the paper, so that the left side of the lip part 3 shown on the paper comes in contact with the to-be-cleaned member 10.

In this manner, switching from cleaning in the direction of an arrow R of FIG. 2A to cleaning in the direction of an arrow R of FIG. 2B causes switching of the surface to be brought into contact with the to-be-cleaned member from the right side to the left side of the lip part 3 shown on the paper.

As described above, it is considered as follows: for a conventional wiper blade made of polyurethane, a difference is caused in how the force is transmitted to the to-be-cleaned member between the hard segment and the soft segment in polyurethane, resulting in the occurrence of streak-shaped unwiped portions.

The cause thereof was presumed as follows. It is considered as follows: for polyurethane for use in a conventional wiper blade, aggregation of the hard segment proceeds, so that the hard segments gather in clumps. As a result, at a microscopic polymer level, there occurs a state in which the difference in hardness between the hard segment and the soft segment is remarkably caused, namely a state in which there is hardness unevenness.

It is considered that when the wiper blade is brought into contact with the to-be-cleaned member in this state, strong contact force portions and weak contact force portions appear irregularly; accordingly, in the process of cleaning (wiping off operation), streak-shaped unwiped portions occur.

Therefore, it was considered that the hard segments in polyurethane are dispersed finely and uniformly, thereby resolving the hardness unevenness. Departing from the consideration, the composition of polyurethane is set as a specific condition. This enables fine and uniform dispersion of the hard segments in polyurethane. As a result, it was possible to still further improve the wipability of the to-be-cleaned member.

The lip part of the present disclosure comprises polyurethane, the polyurethane comprises a reactant of a composition including an isocyanate compound which includes diisocyanate and tri- or higher functional polyfunctional isocyanate, and an alcohol which includes tri- or higher functional polyfunctional alcohol.

The diisocyanate has an aromatic ring in a molecule.

Further, when the polyurethane is heated up to 1000° C. at a temperature rise rate of 10° C./s using a mass spectrometer of direct sample introduction type in which a sample is heated and vaporized in an ionization chamber and a molecule of the sample is ionized, then obtained a detected amount of all ions is defined as M1, an integrated intensity of a peak in an extracted ion thermogram corresponding to an range of an m/z value derived from the tri- or higher functional polyfunctional isocyanate is defined as M2, and an integrated intensity of a peak in an extracted ion thermogram corresponding to an range of an m/z value derived from the diisocyanate is defined as M3, M2/M1 is 0.001 to 0.028, M3/M1 is 0.020 to 0.110, M2/M3 is 0.013 to 0.300, and a concentration of the tri- or higher functional polyfunctional alcohol in the polyurethane is 0.12 mmol/g to 0.65 mmol/g.

Below, a detailed description will be given.

The hard segment is mainly formed by aggregation by the interaction between urethane bonds or the interaction between the aromatic rings of diisocyanate. The hard segments tend to become larger when they can regularly overlap one another. Accordingly, by disturbing the regularity, it is possible to achieve the miniaturization of the hard segment.

Accordingly, as described above, by achieving the composition including tri- or higher functional polyfunctional isocyanate, and tri- or higher functional polyfunctional alcohol within a proper concentration ratio, the orientation is suppressed by steric hindrance. As a result, the hard segments become less likely to be aggregated. For this reason, the hard segments are miniaturized, and are uniformly dispersed.

As a result, in the entire region in the longitudinal direction of the lip part, the contact force of the contact region with the to-be-cleaned member is uniformalized. Accordingly, the contact part can be movable uniformly on the surface of the to-be-cleaned member. For this reason, in the entire region in the longitudinal direction of the wiper blade, excellent wipability not causing wipe-off unevenness can be exhibited.

When the M2/M1 is 0.001 or more, the structure derived from tri- or higher functional polyfunctional isocyanate with low crystallinity is introduced to polyisocyanate forming the hard segment, which can suppress the aggregation of the hard segments. This can disperse the hard segments finely and uniformly.

When the M2/M1 is 0.028 or less, the aggregation between low-molecular-weight polyfunctional components can be suppressed, which can suppress the aggregation of the hard segments. Whereas, in the case of 0.015 or less, the aggregation can be suppressed at a higher level.

When the M3/M1 is 0.020 or more, in the curing reaction, a higher molecular weight tends to be achieved, so that the wear resistance can be improved. Further, 0.040 or more is preferable.

Since the higher the concentration of diisocyanate is, the more, the aggregation of the hard segments progresses, M3/M1 is 0.110 or less. By setting M3/M1 at 0.110 or less, the aggregation of the hard segments can be more suppressed. Further, 0.100 or less is preferable.

When the M2/M3 is 0.013 or more, sufficient tri- or higher functional polyfunctional isocyanate is present for diisocyanate, and hence crystallization by diisocyanate is suppressed. This can suppress the aggregation of the hard segments.

On the other hand, when the M2/M3 is 0.300 or less, the aggregation between low-molecular-weight polyfunctional components can be suppressed, which can suppress the aggregation of the hard segments. Whereas, in the case of 0.150 or less, the aggregation can be suppressed at a higher level.

Further, it is preferable that,
the M2/M1 is 0.001 to 0.015,
the M3/M1 is 0.040 to 0.100, and
the M2/M3 is 0.013 to 0.150, and
the concentration of the tri- or higher functional polyfunctional alcohol in the polyurethane is 0.22 mmol/g to 0.39 mmol/g.

The concentration of the tri- or higher functional polyfunctional alcohol in polyurethane is calculated by the following equation (1). When the concentration of the tri- or higher functional polyfunctional alcohol falls within the foregoing range, the hard segment aggregation suppressing effect is high. Namely, the concentration of the tri- or higher functional polyfunctional alcohol in polyurethane is 0.12 mmol/g to 0.65 mmol/g, and is preferably 0.22 mmol/g to 0.39 mmol/g.

concentration of tri- or higher functional polyfunctional alcohol (mmol/g)=[tri- or higher functional polyfunctional alcohol amount (g)/tri- or higher functional polyfunctional alcohol molecular weight×1000]/[polyurethane mass (g)]  Equation (1)

The polyurethane is preferably a polyurethane elastomer.

The polyurethane elastomer can be obtained from raw materials mainly including polyol, a chain extender, polyisocyanate, a catalyst, other additives, and the like.

The polyurethane elastomer is a block copolymer comprising hard segments and soft segments. The hard segment generally comprises polyisocyanate and a chain extender comprising a short chain diol. On the other hand, the soft segment generally comprises long chain polyol such as polyester polyol, polyether polyol, polycarbonate polyol, and polyisocyanate.

As the polyisocyanate, diisocyanate and tri- or higher functional polyfunctional isocyanate are used in combination.

Examples of diisocyanate may include the following.
4,4'-Diphenylmethane diisocyanate (4,4'-MDI), 2,4-tolylene diisocyanate (2,4-TDI), 2,6-tolylene diisocyanate (2,6-TDI), xylene diisocyanate (XDI), 1,5-naphthylene diisocyanate (1,5-NDI), p-phenylene diisocyanate (PPDI), tetramethyl xylene diisocyanate (TMXDI), and carbodiimide modified MDI.

As diisocyanate, the one having an aromatic ring in the molecule is used. Use of the diisocyanate including an aromatic ring can provide favorable mechanical characteristics and a high reactivity.

Diisocyanate preferably has a structure in which NCO is directly bonded to the aromatic ring. As a result of this, the aggregation of the hard segments can be more suppressed, and still more fine dispersion thereof is possible.

Examples of the tri- or higher functional polyfunctional isocyanate may include the following.

Polymeric MDI, triphenyl methane-4,4',4''-triisocyanate (TTI), tris(phenyl isocyanate)thiophosphate (TPTI), 4-isocyanate methyl-1,8-octamethylene diisocyanate, 1,3,6-hexamethylene triisocyanate, trimethyl benzene triisocyanate, diphenylmethane-2,4-4'-triisocyanate.

The tri- or higher functional polyfunctional isocyanate is more preferably at least one selected from the group consisting of polymeric MDI, triphenyl methane-4,4', 4''-triisocyanate, and tris(phenyl isocyanate)thiophosphate.

The tri- or higher functional polyfunctional isocyanate is preferably at least one selected from the group consisting of polymeric MDI and tris(phenyl isocyanate) thiophosphate. The isocyanate has a methylene group or an ether bond between NCO's. For this reason, the distance between the urethane bonds can be kept properly. For this reason, this is preferable for suppressing the aggregation of the hard segments.

The polymeric MDI is expressed by the following chemical formula (1) and chemical formula (1)'.

The n in the chemical formula (1)' is preferably from 1 to 4.

The chemical formula (1) indicates the case where n is 1 in the chemical formula (1)'.

The branch by tri- or higher functional polyfunctional alcohol can suppress crystallization, and can suppress the aggregation of the hard segments.

On the other hand, when the branches are too many, the density of the urethane bonds in the periphery of the tri- or higher functional polyfunctional alcohol increases, so that the hard segments tend to become more likely to be aggregated. For this reason, out of tri- or higher functional polyfunctional alcohols, tri-functional alcohol is preferably used.

Out of these, the alcohols represented by the following formula (a) or (b) are preferable, as they have a methylene group adjacent to a hydroxy group, which allows the distance between the urethane bonds to be properly maintained.

Specific examples of the tri- or higher functional polyfunctional alcohol may include trimethylol ethane (the one of the following formula (a) where $R_1$ is $CH_3$), trimethylolpropane (TMP: the one of the following formula (a) where $R_1$ is $C_2H_5$), glycerin, pentaerythritol, and sorbitol.

The tri- or higher functional polyfunctional alcohol is preferably at least one selected from the group consisting of the alcohols represented by the following formulae (a) and (b), and glycerin and pentaerythritol.

The tri- or higher functional polyfunctional alcohols can be used singly alone, or in combination of two or more thereof.

In the formulae (a) and (b), $R_1$ and $R_2$ each independently represent H, $CH_3$, or $C_2H_5$.

Examples of the polyol may include the following.

Polyester polyols such as polyethylene adipate polyester polyol, polybutylene adipate polyester polyol, polyhexylene adipate polyester polyol, (polyethylene/polypropylene) adipate polyester polyol, (polyethylene/polybutylene) adipate polyester polyol, and (polyethylene/polyneopentylene) adipate polyester polyol; polycaprolactone type polyol obtained from ring opening polymerization of caprolactone; polyether polyols such as polyethylene glycol, polypropylene glycol, and polytetramethylene glycol; and polycarbonate diol. These can be used singly alone, or in combination of two or more thereof.

Out of the polyols, polyester polyol using adipate is preferable because a polyurethane elastomer excellent in mechanical characteristics can be obtained.

Particularly, the one having an alkylene group with 4 or more carbon atoms such as polybutylene adipate polyester polyol or polyhexylene adipate polyester polyol is preferable. Further, polyols with the alkylene groups having different numbers of carbon atoms such as polybutylene adipate polyester polyol and polyhexylene adipate polyester polyol are preferably used in combination. Use of the different kinds of polyols can also improve the crystallization suppression of the soft segments, so that the soft segments become less likely to gather. As a result, the dispersibility of the hard segments can be more improved.

As the chain extenders, diol which is capable of extending a polyurethane elastomer chain, and tri- or higher functional polyfunctional alcohols can be used.

Examples of diol may include the following.

Ethylene glycol (EG), diethylene glycol (DEG), propylene glycol (PG), dipropylene glycol (DPG), 1,4-butane diol (1,4-BD), 1,6-hexane diol (1,6-HD), 1,4-cyclohexane diol, 1,4-cyclohexane dimethanol, and xylylene glycol (terephthalyl alcohol), and triethylene glycol. These can be used singly alone, or in combination of two or more thereof.

As the catalyst, a polyurethane elastomer curing catalyst for common use can be used. Examples thereof may include a tertiary amine catalyst. Specific examples thereof may include the following. Amino alcohols such as dimethyl ethanolamine, N,N,N'-trimethylamino propyl ethanolamine and N,N'-dimethyl hexanolamine; trialkyl amine such as triethyl amine; tetraalkyl diamine such as N,N,N'N'-tetramethyl-1,3-butane diamine; and triethylene diamine, a piperazine type compound, and a triazine type compound. Further, an organic acid salt of a metal such as potassium acetate or potassium octanoate alkali can also be used.

Further, a metal catalyst to be commonly used for urethanization, for example, dibutyltin dilaurate is also usable. These can be used singly alone, or in combination of two or more thereof.

To the raw materials forming the lip part, if required, the additives such as a pigment, a plasticizer, a waterproofing agent, an antioxidant, an ultraviolet absorber, and a light stabilizer can be mixed.

Manufacturing Method of Wiper Blade

The manufacturing method of the wiper blade has no particular restriction, and can be selected from among known methods.

For example, into a mold for a wiper blade, for example, a polyurethane elastomer raw material composition is injected into the cavity, and heated and cured. As a result, the lip part can be obtained.

Alternatively, at the tip part of the lip part, cutting may be performed, thereby forming a shape. By doing so, molding can be achieved with high smoothness of the contact surface with the to-be-cleaned member of the lip part.

Still alternatively, the following is also acceptable: a pair of molded bodies in a tandem shape formed so that the lip parts are in contact with each other while being opposed to each other are manufactured, and are cut in the longitudinal direction, thereby manufacturing a wiper blade.

Process as a Whole Including a Wiper Arm

The wiper blade of the present disclosure can be used for wiper devices of various types such as a tandem type and an opposed wiping type.

EXAMPLES

Below, the present disclosure will be described by way of manufacturing examples, Examples, and Comparative Examples.

However, the present disclosure is not limited to the Examples, and the like at all. For other materials than those shown in Examples and Comparative Examples, a reagent or an industrial chemical was used. Incidentally, all the expressions "part(s)" in Examples and Comparative Examples are based on mass unless otherwise specified.

Example 1

The materials in the Table 1 below were mixed, and were allowed to react with each other at a temperature of 80° C. for 3 hours, thereby preparing a prepolymer with a NCO content of 10.6 mass %.

TABLE 1

| Material | Mixing amount (g) |
|---|---|
| 4,4'-Diphenylmthane diisocyanate (trade name: MILLIONATE MT manufactured by Tosoh Corporation) (* which will be hereinafter described as "4,4'-MDI, or simply as "MDI") | 200 |
| Polymeric MDI as tri- or more functional multifunctional isocyanate (trade name: MILLIONATE MR-400 manufactured by Tosoh Corporation) (* which will be hereinafter described as "polymeric MDI") | 180 |
| Polybutylene adipate polyester polyol (trade name: NIPPOLAN 3027 manufactured by Tosoh Corporation, number average molecular weight 2500) (* which will be hereinafter described as "PBA 2500") | 620 |

The materials described in Table 2 below were mixed, thereby preparing a curing agent.

TABLE 2

| Material | Mixing amount (g) |
|---|---|
| 1,4-Butane diol (manufactured by Tokyo Chemical Industry Co., Ltd.) (* which will be hereinafter described as "1,4-BD") | 21 |
| Trimethylolpropane (manufactured by Tokyo Chemical Industry Co., Ltd.) (* which will be hereinafter described as "TMP") | 58 |
| Polyhexylene adipate polyester polyol (trade name: NIPPOLAN 164, manufactured by Tosoh Corporation, number average molecular weight 1000) (* which will be hereinafter described as "PHA 1000") | 350 |
| N,N'-dimethyl hexanolamine (trade name: KAOLIZER No. 25 manufactured by Kao Corporation) (* which will be hereinafter described as "No. 25") | 0.57 |

The above prepolymer and the above curing agent were mixed, thereby preparing a raw material composition of polyurethane.

The raw material composition was injected into the cavity of a mold for molding the vehicle wiper blade, and was cured at a temperature of 130° C. for 2 minutes. Then, demolding was performed, and obtain a polyurethane molded body. Incidentally, into the cavity of the molding mold, a release agent A was coated prior to injection of the raw material composition.

The release agent A is a mixture of the materials shown in Table 3 below.

TABLE 3

| Material | Mixing amount (g) |
|---|---|
| ELEMENT 14 PDMS 1000-JC (trade name, manufactured by Momentive Performance Materials Corporation) | 5.06 |
| ELEMENT 14 PDMS 10K-JC (trade name, manufactured by Momentive Performance Materials Corporation) | 6.19 |
| SR1000 (trade name, manufactured by Momentive Performance Materials Corporation) | 3.75 |

TABLE 3-continued

| Material | Mixing amount (g) |
|---|---|
| EXXSOL DSP145/160 (trade name, manufactured by ANDOH PARACHEMIE CO., LTD.) | 85 |

The lip part tip side of the obtained polyurethane molded body was cut, and obtain a wiper blade in accordance with the present Example. The thickness of the lip part tip was set at 0.6 mm, and the length in the longitudinal direction was set at 450 mm. The wiper blade thus obtained was subjected to the following evaluations.

Evaluation 1: Measurement of Size of Hard Segment

The size of the hard segment was measured using a scanning probe microscope (SPM) (trade name: MFP-3D-Origin, manufactured Oxford Instruments Co.) in the following manner.

The preparation method of a sample, and the like are as follows.

Figure 3:
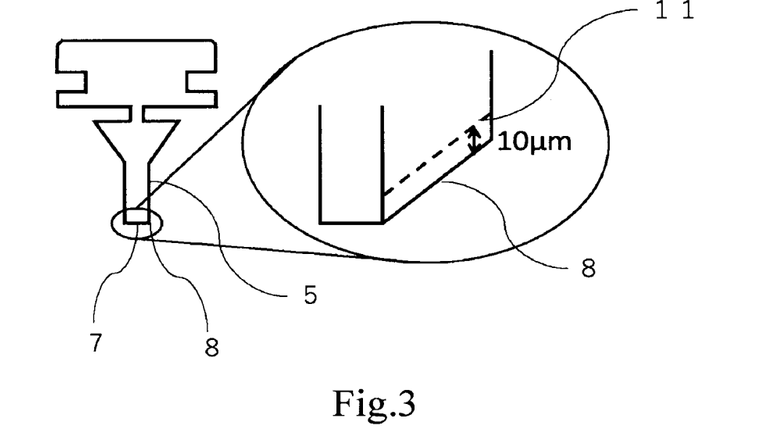
FIG. 3 is an enlarged view of a first edge vicinity.

Herein, the lip part 3 of the vehicle wiper blade has, as shown in FIGS. 2A and 2B, a first tapered surface 5 and a second tapered surface 6 opposite to the first tapered surface 5 to be brought into contact with the to-be-cleaned member 10, and forming a tapered part 4, and a tip surface 7 forming a first edge 8 and a second edge 9 on the farthest side from the blade support part 1 of the lip part 3 together with the first tapered surface 5 and the second tapered surface 6 (for the first edge, the second edge, and the tip surface, see FIGS. 1 and 3).

The present inventors observed the behavior of the wiper blade reciprocating during cleaning. As a result, it could be confirmed that the wiper blade with respect to the to-be-cleaned member during cleaning was in contact with the to-be-cleaned member in the regions centering on the positions about 10 μm from the first edge and the second edge, respectively, at the first tapered surface and the second tapered surface included in the lip part.

Figure 4:
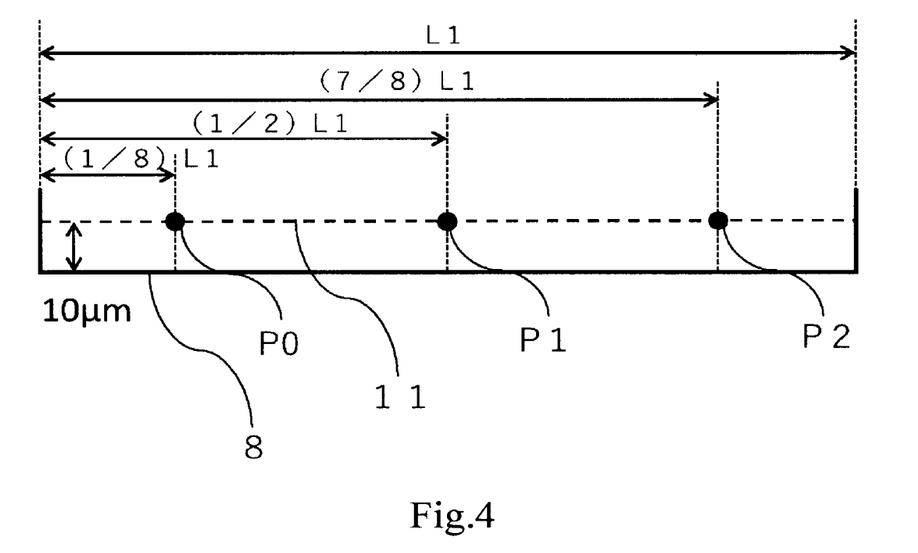
FIG. 4 is an enlarged view of the first line segment vicinity.

Thus, as shown in FIGS. 3 and 4, when a first line segment 11 with a distance from the first edge of 10 μm, and a length of L1 is assumed to be drawn in parallel with the first edge at the first tapered surface of the resulting wiper blade, three measurement samples of 2 mm squares having centers of gravity at P0, P1, and P2 at points of (⅛) L1, (½) L1, and (⅞) L1, respectively, from one end side on the first line segment and with respective one sides in parallel with the first line segment were cut out. Then, from each measurement sample, using a cryomicrotome (UC-6 (trade name), manufactured by Leica Microsystems Co.), polyurethane thin pieces having the centers of gravity at P0, P1, or P2, each of 100 μm square with one side in parallel with the first line segment, and each with a thickness of 1 μm were cut out at −50° C. In this manner, three measurement samples were prepared. Each of the resulting measurement samples was placed on a smooth silicon wafer, and was allowed to stand under environment at room temperature of 25° C. and a humidity of 50% for 24 hours.

Then, the silicon wafer placing the measurement sample thereon was set at a SPM stage, and SPM observation thereof was performed. Incidentally, the spring constant and the proportionality constant of a cantilever made of silicon (trade name: OMCL-AC160, manufactured by Olympus Corporation, tip curvature radius: 8 nm) were previously confirmed to be the following with the thermal noise method mounted on the present SPM device (spring constant: 30.22 nN/nm, proportionality constant: 82.59 nm/V).

Further, previously, tuning of the cantilever was carried out, thereby determining the resonance frequency of the cantilever (285 KHz (primary) and 1.60 MHz higher level)).

The measurement mode of SPM was set at AM-FM mode, the free amplitude of the cantilever, at 3 V (primary) and 25 mV (higher level), and the set point amplitude, at 2 V (primary). In the visual field of a 1 μm×1 μm square, scanning was performed under conditions of a scan rate of 1 Hz, and scan points of 256 vertically and 256 horizontally, thereby acquiring three phase images (256-gradation gray scale). Incidentally, for the visual fields, the positions were selected such that P0, P1, and P2 of each measurement sample were present at the center of the visual field, and each one side was in parallel with the first line segment.

Figure 5A:
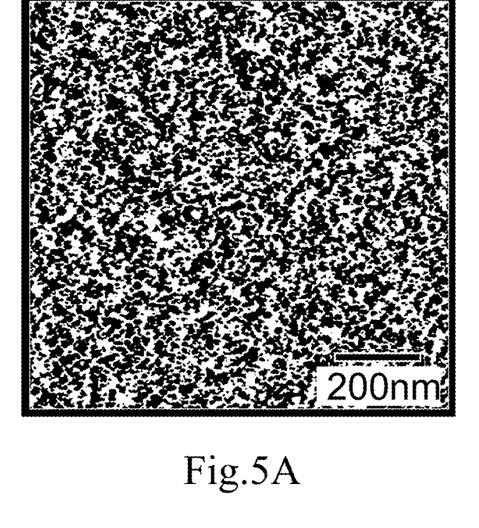
FIGS. 5A and 5B show binarized images of Example 1 and Comparative Example 1, respectively.
Figure 5B:
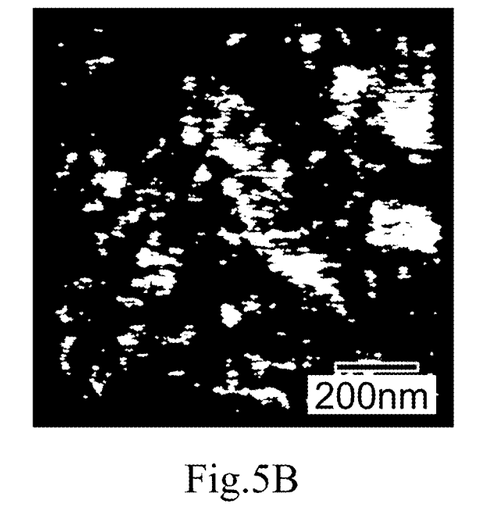

Each of the resulting phase images was subjected to binarization processing using an image processing analysis system (trade name: Luzex-AP, manufactured by NIRECO Corporation). Specifically, the phase image was binarized using the binarization setting function of the image processing analysis system. Incidentally, the threshold value at the binarization setting function was set at 85 (85th on 256 gradation). The operation provided a binarized image in which the soft segment was displayed in black, and the hard segment was displayed in white. As an example, FIG. 5A shows the binarized image of Example 1, and FIG. 5B shows the binarized image of Comparative Example 1.

The size of the hard segment in the resulting binarized image was measured using the image processing analysis system. The size of the hard segment was measured using the "circle-equivalent diameter" parameter.

Further, also for the second tapered surface, three binarized images were formed in the same manner as with the first tapered surface. The size of the hard segment in each binarized image was measured. The arithmetic average value of the sizes of all the hard segments measured from a total of six binarized images thus obtained was defined as the size of the hard segment in the present disclosure.

Evaluation 2: Measurement of M1, M2, and M3

Using the direct sample introduction method (DI method) in which a sample is directly introduced to an ion source without being passed through a gas chromatograph (GC), the measurements of M1 to M3 were performed. As the device, an ion trapping type GC/MS (trade name: POLARIS Q, manufactured by Thermo Fisher Scientific Co.) was used. As a direct introducing probe, a Direct Exposure Probe (DEP) was used.

The 0.1 μg of sample was measured at each of the P0, P1, and P2 of the first tapered surface and the second tapered surface described in Evaluation 1 in the following manner. Namely, the each collected sample was fixed at a filament positioned at the tip of the probe, and was directly introduced into an ionization chamber. Subsequently, the sample was rapidly heated from room temperature to 1000° C. at a constant temperature rise rate (10° C./s), and the vaporized gas was detected by a mass spectrometer.

When the total ion detection amount M1 is assumed to be the sum of the integrated intensities of all the peaks at the resulting total ion current thermogram, and the sum of integrated intensities of the peaks of the extracted ion thermogram of the m/z value derived from tri or higher functional polyfunctional isocyanate is assumed to be M2, and the integrated intensity of the peak of the extracted ion thermogram corresponding to the range of the m/z value derived from diisocyanate is assumed to be M3, using the values of the M1, M2, and M3, (M2/M1), (M3/M1), and (M2/M3) were calculated. Then, the arithmetic average values of all the measurement values obtained from respective samples of the respective P0s, P1s, and P2s of the first tapered surface and the second tapered surface were referred to as (M2/M1), (M3/M1), and (M2/M3) in the present disclosure.

Herein, in the present Example, for the elastic part comprising polyurethane synthesized using a polymeric MDI as tri- or higher functional polyfunctional isocyanate, there was detected the peak derived from the cationized product of polymeric MDI having peak tops at respective positions in which the m/z value indicating n=1 of the structure represented by the chemical formula (1)' falls within the range of 380.5 to 381.5; the m/z value indicating n=2, within the range of 511.5 to 512.5; the m/z value indicating n=3, within the range of 642.5 to 643.5; and the m/z value indicating n=4, within the range of 773.5 to 774.5 in the extracted ion thermogram obtained by the foregoing analysis. Thus, in the present Example, the sum of the integrated intensities of the respective peaks was referred as M2.

Further, in other Examples described later, TTI used as tri- or higher functional polyfunctional isocyanate has the structure shown in the following chemical formula (2). Then, for the elastic part comprising polyurethane synthesized using TTI, there was detected the peak derived from the cationized product of TTI, having the peak top at the position in which m/z is within the range of 366.5 to 367.5 in the extracted ion thermogram obtained by the analysis.

Therefore, in the present Example, the integrated intensity of the peak was referred to as M2.

(2)

Similarly, in Example described later, the TPTI used as tri- or higher functional polyfunctional isocyanate has the structure represented by the following chemical formula (3). Then, for the elastic part comprising polyurethane synthesized using TPTI, there was detected the peak derived from the cationized product of TPTI, having a peak top at the position in which m/z is within the range of 464.5 to 465.5 in the extracted ion thermogram obtained by the analysis.

Therefore, in the present Example, the integrated intensity of the peak was referred to as M2.

(3)

On the other hand, the 4,4'-MDI used as diisocyanate in the present Example has the structure represented by the following chemical formula (7). For the elastic part comprising polyurethane synthesized using 4,4'-MDI, there was detected the peak derived from the cationized product of 4,4'-MDI, having a peak top at a position in which m/z is 249.5 to 250.5 in the extracted ion thermogram obtained by the analysis.

Thus, the integrated intensity of the peak was referred to as M3.

(7)

The toluene diisocyanate (TDI) used as diisocyanate in other Examples has the structures represented by the following chemical formulae (4a) and (4b).

For the elastic part comprising polyurethane synthesized using TDI, there was detected the peak derived from the cationized product of TDI, having a peak top at the position in which m/z is within the range of 173.5 to 174.5 in the extracted ion thermogram obtained by the analysis.

Therefore, the integrated intensity of the peak was referred to as M3.

(4a)

(4b)

M-xylylene diisocyanate (XDI) of diisocyanate has the structure represented by the following chemical formula (5). For the elastic part comprising polyurethane synthesized using XDI, there was detected the peak derived from the cationized product of XDI, having a peak top at the position in which m/z is within the range of 187.5 to 188.5 in the extracted ion thermogram obtained by the analysis.

Therefore, the integrated value of the peak was referred to as M3.

(5)

Further, 1,5-naphthalene diisocyanate (NDI) of diisocyanate has the structure represented by the following chemical formula (6). For the elastic part comprising polyurethane synthesized using NDI, there was detected the peak derived from the cationized product of NDI, having a peak top at the position in which m/z is within the range of 209.5 to 210.5 in the extracted ion thermogram obtained by the analysis.

Therefore, the integrated intensity of the peak was referred to as M3.

(6)

Evaluation 3: Polyfunctional Alcohol Kind, Measurement of Concentration

By pyrolysis GC/MS (gas chromatography and mass spectrometry method), detection of polyfunctional alcohol was performed. The measurement conditions are shown below.

Sampling position: the sample sampled at each of the P0, P1, and P2 of the first tapered surface and the second tapered surface was measured in the following manner.

Device:
Pyrolysis device: trade name: EGA/PY-3030D, manufactured by Frontier Laboratories Ltd.
Gas chromatography device: TRACE1310 gas chromatograph, manufactured by Thermo Fisher Scientific Co.
Mass analyzer: ISQLT, manufactured by Thermo Fisher Scientific Co.
Pyrolysis temperature: 500° C.
GC column: internal diameter 0.25 mm×length 30 m stainless steel capillary column
Stationary phase 5% phenyl polydimethyl siloxane
Temperature rising conditions: held at 50° C. for 3 minutes, and raised in temperature to 300° C. at 8° C./min
MS condition: mass number range m/z 10 to 650 scan rate 1 sec/scanning The polyfunctional alcohol kind was qualified with GC/MS. The calibration curve with GC analysis of the known concentration of the qualified polyfunctional alcohol kind was formed, and quantification was performed from the GC peak area ratio. Then, the arithmetic average value of all the measurement values obtained from respective samples at the respective P0, P1, and P2 of the first tapered surface and the second tapered surface was defined as the concentration of polyfunctional alcohol in the present disclosure.

Evaluation 4: Evaluation of Wiping Performance

Using a test device of the wiping performance test described in Japanese Industrial Standards (JIS) D5710: 1998 (automobile parts—wiper arm, and wiper blade), the wipability of the wiper blade was evaluated. With this test, the wiper blade was mounted, and waterdrops were sprayed in a fog form on the glass surface of the to-be-cleaned member. Then, the state of wiping off water on the glass surface after one reciprocation of the wiper blade was visually observed, and was evaluated according to the following criteria.

Wiping Conditions

Load to be applied to the wiper blade: 10 N/m
Wiping reciprocating speed of the wiper blade: 50 reciprocations/min Evaluation Criteria Rank A: one or less hair line (unwiped portion in a very fine streak with a width of 0.5 mm or less), and 0 heavier line (unwiped portion in a fine streak with a width of 1 mm or less), and wide line (unwiped portion in a band shape with a width up to about 1 to 20 mm, also including a collection of several hair lines and heavier lines, and a thin film-shaped unwiped portion)
Rank B: 2 hair lines, and 0 heavier line and wide line,
Rank C: 2 hair lines, and 1 heavier line, and 0 wide line
Rank D: 3 hair lines, and 1 heavier line, and 0 wide line
Rank E: 4 or more hair lines, or 2 or more heavier lines, or 1 or more wide lines Examples 2 to 48, and Comparative Examples 1 to 6

A prepolymer and a curing agent were obtained in the same manner as in Example 1, except for changing the materials and the amounts for mixing as in Table 4 or Table 5. The resulting wiper blades were evaluated in the same manner as in Example 1.

The details of the material used other than those shown in Example 1 will be shown below.

Polybutylene adipate polyester polyol with a number average molecular weight of 1000 (trade name: NIP-POLAN 4009, manufactured by TOSOH CORPORATION Ltd.) (which will be hereinafter described as PBA 1000)

Polyhexylene adipate polyester polyol with a number average molecular weight of 1000 (trade name: NIP-POLAN 164, manufactured by TOSOH CORPORATION Ltd.) (which will be hereinafter described as PHA 1000)

Polyhexylene adipate polyester polyol with a number average molecular weight of 2600 (trade name: NIP-POLAN 136, manufactured by TOSOH CORPORATION Ltd.) (which will be hereinafter described as PHA 2600)

Polyhexylene adipate polyester polyol with a number average molecular weight of 4500 (trade name: HS2H-451A, manufactured by HOKOKU Corporation) (which will be hereinafter described as PHA 4500)

Polytetramethylene ether glycol with a number average molecular weight of 1000 (trade name: PTG-1000SN, manufactured by Hodogaya Chemical Co., Ltd.) (which will be hereinafter described as PTMG 1000)

Polytetramethylene ether glycol with a number average molecular weight of 2000 (trade name: PTG-2000SN, manufactured by Hodogaya Chemical Co., Ltd. (which will be hereinafter described as PTMG 2000)

Glycerin (manufactured by Tokyo Chemical Industry Co., Ltd.)

Pentaerythritol (manufactured by Tokyo Chemical Industry Co., Ltd.)

Toluene diisocyanate (trade name: CORONATE T-80, manufactured by TOSOH CORPORATION Ltd.) (which will be hereinafter described as TDI)

M-xylylene diisocyanate (product code: D0127, manufactured by Tokyo Chemical Industry Co., Ltd.) (which will be hereinafter described as XDI)

1,5-Naphthalene diisocyanate (product code: N0168, manufactured by Tokyo Chemical Industry Co., Ltd.) (which will be hereinafter described as NDI)

Triphenyl methane-4,4',4"-triisocyanate as the tri- or higher functional polyfunctional isocyanate (trade name: ULTIGHT SUPER CA, manufactured by Toho Kasei Kogyo Co., Ltd) (which will be hereinafter described as TTI)

Tris(phenyl isocyanate)thiophosphate as the tri- or higher functional polyfunctional isocyanate (trade name: ULTIGHT SUPER CAII, manufactured by Toho Kasei Kogyo Co., Ltd) (which will be hereinafter described as TPTI)

The evaluation results of Examples 1 to 48, and Comparative Examples 1 to 6 are shown in Tables 4 and 5.

TABLE 4

| | Composition | | | | | | | | | |
|---|---|---|---|---|---|---|---|---|---|---|
| | Prepolymer | | | | | | Curing agent | | | |
| | Diisocyanate | | Tri- or more functional multifunctional isocyanate | | Polyol | | Low molecular weight diol | | Tri- or more functional multifunctional alcohol | |
| | Type | Mixing amount (g) | Type | Mixing amount (g) | Type | Mixing amount (g) | Type | Mixing amount (g) | Type | Mixing amount (g) |
| Example 1 | MDI | 200 | Polymeric MDI | 180 | PBA2500 | 620 | 1,4-BD | 21 | TMP | 58 |
| Example 2 | MDI | 200 | Polymeric MDI | 100 | PHA4500 | 700 | — | 0 | TMP | 50 |
| Example 3 | MDI | 10 | Polymeric MDI | 290 | PBA2500 | 700 | 1,4-BD | 24 | TMP | 30 |
| Example 4 | MDI | 20 | Polymeric MDI | 930 | PBA1000 | 50 | 1,4-BD | 300 | TMP | 22 |

TABLE 4-continued

| | | | | | | | | | | | |
|---|---|---|---|---|---|---|---|---|---|---|---|
| Example 5 | MDI | 80 | Polymeric MDI | 820 | PBA1000 | 100 | 1,4-BD | 285 | TMP | | 22 |
| Example 6 | MDI | 50 | Polymeric MDI | 910 | PBA1000 | 40 | 1,4-BD | 310 | TMP | | 23 |
| Example 7 | MDI | 440 | Polymeric MDI | 60 | PBA1000 | 500 | 1,4-BD | 68 | TMP | | 25 |
| Example 8 | MDI | 440 | Polymeric MDI | 60 | PBA1000 | 500 | — | 0 | TMP | | 56 |
| Example 9 | MDI | 310 | Polymeric MDI | 90 | PHA4500 | 600 | — | 0 | TMP | | 76 |
| Example 10 | MDI | 120 | Polymeric MDI | 280 | PBA2500 | 600 | — | 0 | TMP | | 53 |
| Example 11 | MDI | 220 | Polymeric MDI | 530 | PBA1000 | 250 | 1,4-BD | 184 | TMP | | 42 |
| Example 12 | MDI | 10 | Polymeric MDI | 405 | PHA4500 | 585 | — | 0 | TMP | | 125 |
| Example 13 | MDI | 20 | Polymeric MDI | 930 | PBA1000 | 50 | 1,4-BD | 215 | TMP | | 116 |
| Example 14 | MDI | 80 | Polymeric MDI | 820 | PBA1000 | 100 | 1,4-BD | 190 | TMP | | 117 |
| Example 15 | MDI | 170 | Polymeric MDI | 730 | PBA1000 | 100 | 1,4-BD | 190 | TMP | | 117 |
| Example 16 | MDI | 440 | Polymeric MDI | 60 | PBA2500 | 500 | 1,4-BD | 10 | TMP | | 136 |
| Example 17 | MDI | 440 | Polymeric MDI | 60 | PBA2500 | 500 | — | 0 | TMP | | 114 |
| Example 18 | MDI | 310 | Polymeric MDI | 90 | PHA4500 | 600 | — | 0 | TMP | | 100 |
| Example 19 | MDI | 120 | Polymeric MDI | 280 | PBA2500 | 600 | — | 0 | TMP | | 95 |
| Example 20 | MDI | 220 | Polymeric MDI | 530 | PBA1000 | 250 | 1,4-BD | 150 | TMP | | 75 |
| Example 21 | MDI | 200 | Polymeric MDI | 180 | PBA2500 | 620 | 1,4-BD | 23 | Glycerin | | 40 |
| Example 22 | MDI | 50 | Polymeric MDI | 500 | PBA2500 | 450 | 1,4-BD | 60 | Glycerin | | 65 |
| Example 23 | MDI | 200 | Polymeric MDI | 180 | PBA2500 | 620 | 1,4-BD | 9 | Pentaerythritol | | 55 |
| Example 24 | MDI | 50 | Polymeric MDI | 500 | PBA2500 | 450 | 1,4-BD | 25 | Pentaerythritol | | 100 |
| Example 25 | MDI | 240 | Polymeric MDI | 210 | PTMG1000 | 550 | 1,4-BD | 21 | TMP | | 58 |
| Example 26 | MDI | 200 | Polymeric MDI | 180 | PTMG2000 | 620 | 1,4-BD | 21 | TMP | | 58 |
| Example 27 | MDI | 200 | Polymeric MDI | 180 | PHA2600 | 620 | 1,4-BD | 21 | TMP | | 58 |
| Example 28 | TDI | 122 | Polymeric MDI | 180 | PBA2500 | 698 | 1,4-BD | 21 | TMP | | 58 |
| Example 29 | TDI | 30 | Polymeric MDI | 520 | PBA2500 | 450 | 1,4-BD | 72 | TMP | | 100 |
| Example 30 | XDI | 135 | Polymeric MDI | 180 | PBA2500 | 685 | 1,4-BD | 21 | TMP | | 58 |

| | Composition Curing agent | | | | | | SPM | | |
|---|---|---|---|---|---|---|---|---|---|
| | Polyol | | Catalyst | | | | | Average | |
| | | Mixing amount | | Mixing amount | Mass analysis | | | Triol concentration | hard segment size | Evaluation |
| | Type | (g) | Type | (g) | M2/M1 | M3/M1 | M2/M3 | (mmol/g) | (nm) | Rank |
| Example 1 | PHA1000 | 350 | No. 25 | 0.57 | 0.005 | 0.065 | 0.070 | 0.30 | 22 | A |
| Example 2 | PHA4500 | 2150 | No. 25 | 1.28 | 0.001 | 0.024 | 0.047 | 0.12 | 34 | B |
| Example 3 | PHA2600 | 750 | No. 25 | 0.72 | 0.006 | 0.021 | 0.295 | 0.12 | 33 | B |
| Example 4 | PHA1000 | 20 | No. 25 | 0.54 | 0.028 | 0.094 | 0.298 | 0.12 | 38 | B |
| Example 5 | PHA1000 | 40 | No. 25 | 0.54 | 0.023 | 0.098 | 0.235 | 0.12 | 32 | B |
| Example 6 | PHA1000 | 20 | No. 25 | 0.54 | 0.027 | 0.104 | 0.258 | 0.13 | 32 | B |
| Example 7 | PHA1000 | 450 | No. 25 | 0.62 | 0.001 | 0.108 | 0.013 | 0.12 | 35 | B |
| Example 8 | PHA1000 | 870 | No. 25 | 0.77 | 0.001 | 0.087 | 0.013 | 0.22 | 24 | A |
| Example 9 | PHA2600 | 1530 | No. 25 | 1.04 | 0.001 | 0.047 | 0.027 | 0.22 | 28 | A |
| Example 10 | PHA1000 | 750 | No. 25 | 0.72 | 0.006 | 0.042 | 0.134 | 0.22 | 24 | A |
| Example 11 | PHA1000 | 210 | No. 25 | 0.57 | 0.014 | 0.099 | 0.146 | 0.22 | 26 | A |
| Example 12 | PHA4500 | 350 | No. 25 | 0.75 | 0.007 | 0.025 | 0.280 | 0.63 | 33 | B |
| Example 13 | PHA1000 | 20 | No. 25 | 0.54 | 0.028 | 0.095 | 0.295 | 0.64 | 34 | B |
| Example 14 | PHA1000 | 40 | No. 25 | 0.54 | 0.022 | 0.097 | 0.229 | 0.65 | 38 | B |
| Example 15 | PHA1000 | 40 | No. 25 | 0.54 | 0.020 | 0.109 | 0.181 | 0.65 | 39 | B |
| Example 16 | PHA2600 | 410 | No. 25 | 0.62 | 0.001 | 0.107 | 0.013 | 0.65 | 32 | B |
| Example 17 | PHA2000 | 1040 | No. 25 | 0.86 | 0.001 | 0.077 | 0.013 | 0.39 | 30 | A |
| Example 18 | PHA4500 | 150 | No. 25 | 1.04 | 0.001 | 0.047 | 0.027 | 0.29 | 27 | A |
| Example 19 | PHA2600 | 710 | No. 25 | 0.72 | 0.006 | 0.042 | 0.134 | 0.39 | 24 | A |
| Example 20 | PHA1000 | 210 | No. 25 | 0.57 | 0.015 | 0.099 | 0.147 | 0.39 | 26 | A |
| Example 21 | PHA1000 | 350 | No. 25 | 0.57 | 0.005 | 0.066 | 0.070 | 0.31 | 25 | A |
| Example 22 | PHA1000 | 250 | No. 25 | 0.55 | 0.013 | 0.055 | 0.239 | 0.51 | 35 | B |
| Example 23 | PHA1000 | 350 | No. 25 | 0.57 | 0.005 | 0.066 | 0.070 | 0.29 | 40 | B |
| Example 24 | PHA1000 | 250 | No. 25 | 0.55 | 0.013 | 0.055 | 0.239 | 0.53 | 48 | C |
| Example 25 | PTMG1000 | 350 | No. 25 | 0.57 | 0.005 | 0.078 | 0.069 | 0.30 | 27 | A |
| Example 26 | PTMG1000 | 350 | No. 25 | 0.57 | 0.005 | 0.065 | 0.070 | 0.30 | 28 | A |
| Example 27 | PBA1000 | 350 | No. 25 | 0.57 | 0.005 | 0.065 | 0.070 | 0.30 | 25 | A |
| Example 28 | PHA1000 | 350 | No. 25 | 0.57 | 0.005 | 0.067 | 0.068 | 0.30 | 28 | A |
| Example 29 | PHA1000 | 400 | No. 25 | 0.63 | 0.012 | 0.065 | 0.185 | 0.47 | 38 | B |
| Example 30 | PHA1000 | 350 | No. 25 | 0.57 | 0.005 | 0.063 | 0.073 | 0.30 | 34 | B |

TABLE 5

| | Composition | | | | | | | | | |
|---|---|---|---|---|---|---|---|---|---|---|
| | Prepolymer | | | | | | Curing agent | | | |
| | Diisocyanate | | Tri- or more functional multifunctional isocyanate | | Polyol | | Low molecular weight diol | | Tri- or more functional multifunctional alcohol | |
| | Type | Mixing amount (g) | Type | Mixing amount (g) | Type | Mixing amount (g) | Type | Mixing mount (g) | Type | Mixing amount (g) |
| Example 31 | XDI | 40 | Polymeric MDI | 520 | PBA2500 | 440 | 1,4-BD | 72 | TMP | 100 |
| Example 32 | NDI | 157 | Polymeric MDI | 180 | PBA2500 | 663 | 1,4-BD | 21 | TMP | 58 |
| Example 33 | NDI | 62 | Polymeric MDI | 520 | PBA2500 | 418 | 1,4-BD | 72 | TMP | 100 |
| Example 34 | MDI | 200 | TTI | 720 | PBA2500 | 620 | 1,4-BD | 21 | TMP | 58 |
| Example 35 | MDI | 250 | TTI | 1400 | PBA2500 | 400 | 1,4-BD | 81 | TMP | 100 |
| Example 36 | MDI | 250 | TTI | 520 | PBA2500 | 620 | 1,4-BD | 7 | Pentaerythritol | 58 |
| Example 37 | MDI | 250 | TTI | 1400 | PBA2500 | 400 | 1,4-BD | 48 | Pentaerythritol | 100 |
| Example 38 | MDI | 200 | TPTI | 720 | PBA2500 | 620 | 1,4-BD | 21 | TMP | 58 |
| Example 39 | MDI | 250 | TPTI | 1400 | PBA2500 | 400 | 1,4-BD | 81 | TMP | 100 |
| Example 40 | MDI | 250 | TPTI | 520 | PBA2500 | 620 | — | 0 | Pentaerythritol | 58 |
| Example 41 | MDI | 250 | TPTI | 1400 | PBA2500 | 400 | 1,4-BD | 28 | Pentaerythritol | 100 |
| Example 42 | XDI | 200 | TTI | 720 | PBA2500 | 620 | 1,4-BD | 21 | Pentaerythritol | 58 |
| Example 43 | XDI | 250 | TTI | 1400 | PBA2500 | 400 | 1,4-BD | 81 | Pentaerythritol | 100 |
| Example 44 | XDI | 135 | Polymeric MDI | 180 | PBA2500 | 685 | 1,4-BD | 21 | Pentaerythritol | 58 |
| Example 45 | XDI | 40 | Polymeric MDI | 520 | PBA2500 | 440 | 1,4-BD | 72 | Pentaerythritol | 100 |
| Example 46 | XDI | 200 | TTI | 720 | PBA2500 | 620 | 1,4-BD | 21 | TMP | 58 |
| Example 47 | XDI | 250 | TTI | 1400 | PBA2500 | 400 | 1,4-BD | 81 | TMP | 100 |
| Example 48 | MDI | 170 | Polymeric MDI | 730 | PBA1000 | 100 | 1,4-BD | 245 | TMP | 60 |
| Comparative Example 1 | MDI | 80 | Polymeric MDI | 220 | PHA4500 | 700 | 1,4-BD | 30 | TMP | 20 |
| Comparative Example 2 | MDI | 440 | Polymeric MDI | 60 | PBA2500 | 500 | 1,4-BD | 10 | TMP | 136 |
| Comparative Example 3 | MDI | 0 | Polymeric MDI | 990 | PBA1000 | 10 | 1,4-BD | 210 | TMP | 140 |
| Comparative Example 4 | MDI | 600 | Polymeric MDI | 0 | PBA1000 | 400 | 1,4-BD | 50 | TMP | 90 |
| Comparative Example 5 | MDI | 5 | TTI | 985 | PBA1000 | 10 | 1,4-BD | 250 | TMP | 100 |
| Comparative Example 6 | MDI | 200 | Polymeric MDI | 180 | PBA2500 | 620 | 1,4-BD | 82 | TMP | 0 |

| | Composition Curing agent | | | | Mass analysis | | | SPM | | |
|---|---|---|---|---|---|---|---|---|---|---|
| | Polyol | | Catalyst | | | | | Triol concentration (mmol/g) | Average hard segment size (nm) | Evaluation Rank |
| | Type | Mixing amount (g) | Type | Mixing amount (g) | M2/M1 | M3/M1 | M2/M3 | | | |
| Example 31 | PHA1000 | 400 | No. 25 | 0.63 | 0.012 | 0.063 | 0.190 | 0.47 | 47 | C |
| Example 32 | PHA1000 | 350 | No. 25 | 0.57 | 0.005 | 0.065 | 0.071 | 0.30 | 24 | A |
| Example 33 | PHA1000 | 400 | No. 25 | 0.63 | 0.012 | 0.063 | 0.192 | 0.47 | 31 | B |
| Example 34 | PHA1000 | 350 | No. 25 | 0.79 | 0.005 | 0.065 | 0.073 | 0.30 | 31 | B |
| Example 35 | PHA1000 | 250 | No. 25 | 0.99 | 0.014 | 0.063 | 0.214 | 0.52 | 45 | C |
| Example 36 | PHA1000 | 350 | No. 25 | 0.72 | 0.005 | 0.064 | 0.080 | 0.30 | 41 | C |
| Example 37 | PHA1000 | 250 | No. 25 | 0.98 | 0.014 | 0.065 | 0.214 | 0.53 | 65 | D |
| Example 38 | PHA1000 | 350 | No. 25 | 0.79 | 0.004 | 0.065 | 0.061 | 0.30 | 30 | A |
| Example 39 | PHA1000 | 250 | No. 25 | 0.98 | 0.011 | 0.063 | 0.179 | 0.52 | 38 | B |
| Example 40 | PHA1000 | 350 | No. 25 | 0.72 | 0.004 | 0.064 | 0.066 | 0.30 | 40 | B |
| Example 41 | PHA1000 | 250 | No. 25 | 0.97 | 0.012 | 0.066 | 0.179 | 0.53 | 60 | C |
| Example 42 | PHA1000 | 350 | No. 25 | 0.79 | 0.005 | 0.069 | 0.070 | 0.30 | 68 | D |
| Example 43 | PHA1000 | 250 | No. 25 | 0.99 | 0.012 | 0.060 | 0.197 | 0.47 | 83 | D |
| Example 44 | PHA1000 | 350 | No. 25 | 0.57 | 0.005 | 0.065 | 0.075 | 0.30 | 55 | C |
| Example 45 | PHA1000 | 400 | No. 25 | 0.63 | 0.013 | 0.061 | 0.205 | 0.47 | 72 | D |
| Example 46 | PHA1000 | 350 | No. 25 | 0.79 | 0.005 | 0.063 | 0.079 | 0.30 | 59 | C |
| Example 47 | PHA1000 | 250 | No. 25 | 0.99 | 0.012 | 0.064 | 0.189 | 0.47 | 76 | D |

TABLE 5-continued

| | | | | | | | | | | |
|---|---|---|---|---|---|---|---|---|---|---|
| Example 48 | PHA1000 | 250 | No. 25 | 0.99 | 0.020 | 0.109 | 0.181 | 0.33 | 35 | B |
| Comparative Example 1 | PHA4500 | 2150 | No. 25 | 1.28 | 0.002 | 0.014 | 0.163 | 0.02 | 108 | E |
| Comparative Example 2 | PHA1000 | 160 | No. 25 | 0.52 | 0.002 | 0.128 | 0.013 | 0.78 | 101 | E |
| Comparative Example 3 | PHA1000 | 10 | No. 25 | 0.54 | 0.031 | 0.000 | — | 0.77 | 132 | E |
| Comparative Example 4 | PHA1000 | 500 | No. 25 | 1.04 | 0.000 | 0.138 | 0.000 | 0.22 | 115 | E |
| Comparative Example 5 | PHA1000 | 10 | No. 25 | 0.54 | 0.039 | 0.001 | 29.049 | 0.55 | 132 | E |
| Comparative Example 6 | PHA1000 | 350 | No. 25 | 0.57 | 0.005 | 0.065 | 0.070 | 0.00 | 112 | E |

One aspect of the present disclosure can provide a vehicle wiper blade capable of exhibiting excellent wipability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A vehicle wiper blade comprising:
a blade support part;
a neck; and
a lip part coupled swingably with the blade support part via the neck, the neck being narrowed in width with respect to the blade support part and the lip part in a cross section in a direction orthogonal to a longitudinal direction of the wiper blade,
a part of the lip part being brought into contact with a surface of a to-be-cleaned member, and thereby the surface of the to-be-cleaned member being cleaned,
the lip part comprising polyurethane, the polyurethane comprising a reactant of a composition including:
an isocyanate compound which includes diisocyanate and tri- or higher functional polyfunctional isocyanate; and
an alcohol which includes tri- or higher functional polyfunctional alcohol,
the diisocyanate having an aromatic ring in a molecule thereof,
wherein when the polyurethane is heated up to 1000° C. at a temperature rise rate of 10° C./s using a mass spectrometer of direct sample introduction type in which a sample is heated and vaporized in an ionization chamber and a molecule of the sample is ionized, then obtained
a detected amount of all ions is defined as M1,
an integrated intensity of a peak in an extracted ion thermogram corresponding to a range of an m/z value derived from the tri- or higher functional polyfunctional isocyanate is defined as M2, and
an integrated intensity of a peak in an extracted ion thermogram corresponding to a range of an m/z value derived from the diisocyanate is defined as M3,
M2/M1 is 0.001 to 0.028,
M3/M1 is 0.020 to 0.110,
M2/M3 is 0.013 to 0.300, and
a concentration of the tri- or higher functional polyfunctional alcohol in the polyurethane is 0.12 mmol/g to 0.65 mmol/g.

2. The vehicle wiper blade according to claim 1, wherein the M2/M1 is 0.001 to 0.015,
the M3/M1 is 0.040 to 0.100,
the M2/M3 is 0.013 to 0.150, and
the concentration of the tri- or higher functional polyfunctional alcohol in the polyurethane is 0.22 mmol/g to 0.39 mmol/g.

3. The vehicle wiper blade according to claim 1, wherein the diisocyanate has a structure in which NCO is directly bonded to the aromatic ring.

4. The vehicle wiper blade according to claim 1, wherein the tri- or higher functional polyfunctional isocyanate is at least one selected from the group consisting of polymeric MDI, triphenyl methane-4,4',4"-triisocyanate, and tris(phenyl isocyanate)thiophosphate.

5. The vehicle wiper blade according to claim 1, wherein the tri- or higher functional polyfunctional alcohol is at least one selected from the group consisting of alcohols expressed by formulae (a), alcohols expressed by formulae (b), and pentaerythritol:

where in the formulae (a) and (b), $R_1$ and $R_2$ each independently represent H, $CH_3$, or $C_2H_5$.

* * * * *